(12) United States Patent
Bergfeld (10) Patent No.: US 11,965,581 B2
(45) Date of Patent: Apr. 23, 2024

(54) SPRING FOR A CHECK VALVE, CHECK VALVE HAVING A SPRING OF THIS KIND, CONTROLLABLE VIBRATION DAMPER HAVING SUCH A CHECK VALVE, AND MOTOR VEHICLE HAVING A CONTROLLABLE VIBRATION DAMPER OF THIS KIND

(71) Applicant: Kendrion (Villingen) GmbH, Villingen-Schwenningen (DE)

(72) Inventor: Björn Bergfeld, Balingen-Endingen (DE)

(73) Assignee: Kendrion (Villingen) GmbH, Villingen-Schwenningen (DE)

( * ) Notice: Subject to any disclaimer, the term of this patent is extended or adjusted under 35 U.S.C. 154(b) by 859 days.

(21) Appl. No.: 16/968,526

(22) PCT Filed: Oct. 22, 2018

(86) PCT No.: PCT/EP2018/078865
§ 371 (c)(1),
(2) Date: Jan. 4, 2021

(87) PCT Pub. No.: WO2019/154533
PCT Pub. Date: Aug. 15, 2019

(65) Prior Publication Data
US 2021/0172492 A1    Jun. 10, 2021

(30) Foreign Application Priority Data

Feb. 7, 2018  (DE) ................. 10 2018 102 758.3

(51) Int. Cl.
F16F 9/34    (2006.01)
F16F 3/02    (2006.01)
(Continued)

(52) U.S. Cl.
CPC ............. *F16F 9/34* (2013.01); *F16F 3/023* (2013.01); *F16F 9/19* (2013.01); *F16K 17/0433* (2013.01);
(Continued)

(58) Field of Classification Search
CPC ...... F16F 9/34; F16F 3/023; F16F 9/19; F16F 9/516; F16F 2222/12; F16F 2222/126;
(Continued)

(56) References Cited

U.S. PATENT DOCUMENTS 1,323,188 A  *  11/1919  Humphris ............... F16B 39/24
411/164
3,483,888 A  *  12/1969  Wurzel ................... F16K 51/00
403/123

(Continued)

FOREIGN PATENT DOCUMENTS

DE      3803888      8/1989
DE     10143433      4/2003
(Continued)

OTHER PUBLICATIONS

Japanese Patent Office, "Notice of Reasons for Refusal," and English translation thereof, dated Oct. 19, 2021 in Japanese Patent Application No. 2020-542563, document of 8 pages.
(Continued)

*Primary Examiner* — Robert A. Siconolfi
*Assistant Examiner* — James K Hsiao
(74) *Attorney, Agent, or Firm* — Akerman LLP; Peter A. Chiabotti (57) ABSTRACT

A spring for a check valve which can be used in particular in controllable vibration dampers, said spring comprising a flat main body with a first surface, a second surface and a centre point, and two or more spring arms, which cooperate resiliently with the main body and in the unloaded state
(Continued)

protrude from the first surface or the second surface, the spring arms forming a free end and having a longitudinal axis that runs through the free end and tangentially to a circle about the centre point of the main body. The invention further relates to a check valve having a spring of this kind. In addition, the invention relates to a controllable vibration damper which comprises such a check valve, and to a motor vehicle having a controllable vibration damper of this kind.

14 Claims, 4 Drawing Sheets

(51) Int. Cl.
| | | |
|---|---|---|
| *F16F 9/19* | (2006.01) | |
| *F16K 17/04* | (2006.01) | |
| *B60G 11/27* | (2006.01) | |
| *B60G 13/08* | (2006.01) | |
| *F16F 9/516* | (2006.01) | |

(52) U.S. Cl.
CPC ............ *B60G 11/27* (2013.01); *B60G 13/08* (2013.01); *B60G 2202/152* (2013.01); *B60G 2202/24* (2013.01); *B60G 2204/62* (2013.01); *B60G 2206/41* (2013.01); *B60G 2206/42* (2013.01); *B60G 2500/11* (2013.01); *B60G 2500/201* (2013.01); *B60G 2600/21* (2013.01); *B60G 2800/162* (2013.01); *F16F 9/516* (2013.01); *F16F 2222/12* (2013.01); *F16F 2222/126* (2013.01); *F16F 2228/066* (2013.01); *F16F 2230/183* (2013.01); *F16F 2232/08* (2013.01); *F16F 2234/02* (2013.01); *F16F 2238/022* (2013.01)

(58) Field of Classification Search
CPC ........... F16F 2228/066; F16F 2230/183; F16F 2232/08; F16F 2234/02; F16F 2238/022; B60G 2800/162; B60G 11/27; B60G 13/08; B60G 2202/152; B60G 2202/24; B60G 2204/62; B60G 2206/41; B60G 2206/42; B60G 2500/11; B60G 2500/201; B60G 2600/21; F16K 17/0433; F16K 31/0655; F16K 1/54
See application file for complete search history.

(56) References Cited

U.S. PATENT DOCUMENTS

| | | | | |
|---|---|---|---|---|
| 3,921,670 | A * | 11/1975 | Clippard, Jr | F16K 31/0606 137/625.65 |
| 4,986,393 | A | 1/1991 | Preukschat et al. | |
| 5,211,372 | A * | 5/1993 | Smith, Jr. | F01L 35/00 251/75 |
| 5,624,193 | A * | 4/1997 | Vogelsberger | F16C 25/083 384/517 |
| 5,672,053 | A | 9/1997 | Sabha | |
| 5,709,516 | A * | 1/1998 | Peterson | F01D 25/243 267/162 |
| 6,220,569 | B1 * | 4/2001 | Kelly | F16K 31/06 251/129.08 |
| 6,983,924 | B2 * | 1/2006 | Howell | F16F 3/026 251/118 |
| 7,748,683 | B1 * | 7/2010 | Kelly | F16K 31/0655 251/129.08 |
| 8,246,023 | B2 * | 8/2012 | Cappeller | F16F 3/023 267/102 |
| 10,054,243 | B1 * | 8/2018 | Kelly | G05D 7/0126 |
| 10,088,068 | B2 * | 10/2018 | Marocchini | F16K 31/0655 |
| 10,240,829 | B2 * | 3/2019 | Richardson | B60H 1/00835 |
| 2003/0070713 | A1 | 4/2003 | Cornea et al. | |
| 2005/0175490 | A1 * | 8/2005 | Seto | F16K 15/16 417/559 |
| 2010/0181518 | A1 | 7/2010 | Kowalski | |
| 2012/0045158 | A1 * | 2/2012 | Mashino | F16C 25/083 384/513 |
| 2012/0145496 | A1 | 6/2012 | Goetz et al. | |
| 2012/0228533 | A1 * | 9/2012 | Ams | F01N 3/2066 251/129.03 |
| 2013/0306894 | A1 * | 11/2013 | Wei | F16K 31/0655 251/359 |
| 2014/0102089 | A1 * | 4/2014 | Mayer | B60T 8/42 251/239 |
| 2014/0182696 | A1 | 7/2014 | Wimmer | |
| 2016/0290427 | A1 * | 10/2016 | Huang | F16F 3/00 |

FOREIGN PATENT DOCUMENTS

| | | |
|---|---|---|
| DE | 102012218553 | 4/2014 |
| DE | 102015119767 | 5/2017 |
| EP | 2470809 | 3/2015 |
| JP | S4636941 | 12/1971 |
| JP | S4831537 | 9/1973 |
| JP | 2012127238 | 7/2012 |
| WO | 2012069213 | 5/2012 |

OTHER PUBLICATIONS

World Intellectual Property Organization, "International Search Report," and English translation thereof, issued in PCT/EP2018/078865, dated Feb. 22, 2019, document of 6, pages.

German Patent Office, "Office Action," issued in German Patent Application No. 10 2018 102 758.3, dated Jul. 5, 2018, document of 10 pages.

* cited by examiner

SPRING FOR A CHECK VALVE, CHECK VALVE HAVING A SPRING OF THIS KIND, CONTROLLABLE VIBRATION DAMPER HAVING SUCH A CHECK VALVE, AND MOTOR VEHICLE HAVING A CONTROLLABLE VIBRATION DAMPER OF THIS KIND

CROSS REFERENCE TO RELATED APPLICATIONS

This application is a § 371 National Phase of PCT/EP2018/078865, filed Oct. 22, 2018, which claims priority to German Patent Application No. 10 2018 102 758.3, filed Feb. 7 2018.

SUMMARY

The present application relates to a spring for a check valve as well as to a check valve with such a spring. The application relates moreover to a controllable vibration damper that comprises such a check valve as well as to a motor vehicle with such a controllable vibration damper.

Controllable vibration dampers are disclosed, for example, in DE 38 03 888 C2 and are utilized in particular for the control of the damping force of motor vehicles in order to adapt the vehicle to the demands of the driving route. This can take place automatically under self-actuation in a control circuit of the motor vehicle. However, it is also possible for the damping force profile to be manually set by the driver. The design-engineering implementation of the vibration damper is normally configured such that it becomes possible to detect the movement of platform and wheel suspension of the motor vehicle and to select a high damping force in such movement states in which the direction of the generated damping force is directed counter to the movement of the vehicle platform. A low damping force is selected if the damping force and platform movement of the motor vehicle are equidirectional. However, in this case the driver can himself also increasingly more frequently set the desired damping force manually. In DE 38 03 888 C2 the valve device connected to the working cylinder for this purpose comprises two damping elements that can each individually or jointly be connected into the flow path and which for the rebound and compression damping comprise in each instance two antiparallel connected check valves.

Another controllable vibration damper is shown in EP 2 470 809 B1. The vibration damper described therein for a wheel suspension of a motor vehicle is provided with a valve device which is installed within a damper or as a working cylinder. The valve device described therein comprises two main slide valves, denoted damping valves, that are connected across a switchable switching valve. The valve device connected therein to the working cylinder comprises additionally several check valves.

In an effort to utilize the limited available installation space in a motor vehicle as optimally as possible, the installation space required by the check valves is also to be decreased, in particular also for the reason that since, depending on the development of controllable vibration dampers, a relatively high number of check valves is required.

Even if the installation space of the check valves is to be decreased, it is desirable for an adequate volume flow to be simultaneously realized with the check valves at the lowest possible pressure loss. Consequently, a sufficiently large valve lift must be available. The coil springs themselves that are conventionally employed in check valves require a relatively large installation space.

One embodiment of the present application therefore addresses the problem of developing a spring for a check valve which requires low installation space and, even at a comparatively large valve lift, is at least approximately fatigue endurable, thus, in comparison with known springs, fails markedly later. One objective of an embodiment of the application is furthermore specifying a check valve which, in spite of low installation space, provides a large volume flow at low pressure loss One embodiment of the application relates to a spring for a check valve which is in particular applicable in controllable vibration dampers, comprising a laminar base body with a first surface and a second surface as well as a center point, two or more spring arms that resiliently cooperate with the base body and which in the relieved state lift from the first surface or the second surface, wherein the spring arms form a free end and have a longitudinal axis which extends through the free end and tangentially to a circle about the center point of the base body.

Within the frame of the present description by the term "resiliently cooperate with the base body" is to be understood that the spring arms under load generate a reset force acting between the base body and the spring arms. By 'free end' is to be understood the end of the spring arms which is not connected with the base body.

For example, in battery-operated devices such as flashlights, resilient contacts are known with which the batteries are pressed against a further contact located at the opposite end of the battery. These contacts can also comprise a spring arm cooperating resiliently with a base body, as, for example, disclosed in DE 10 2015 119 767 A1. However, batteries must be contacted as centrally as possible so that these contacts are formed by only one spring arm which, additionally, does not extend tangentially to the center point of the base body. Such contacts are also not laid out for dynamic loading.

Due to the tangential orientation of the spring arms referred to the center point of the base body, several spring arms can be provided without these interfering with one another. It is feasible to provide a number of first spring arms on a first circle with a first diameter and a number of second spring arms on a second circle with a second diameter. The number of spring arms can vary. The available installation space is consequently optimally utilized and a comparatively high reset force is provided. For technical reasons of fabrication a number of three spring arms has been found to be optimal. The fabrication can, on the one hand, be shaped simply and therewith largely trouble-free, and, on the other hand, a statically defined contact of the spring arms on the relevant adjacently disposed structural part can be achieved.

In comparison to coil springs, the proposed spring arms are exclusively subject to bending loads and not to torsion loads. The utilized material can be selected specifically to be optimized toward the prevailing bending load. The tension states in the spring are less complex leading to the fact that the number of valve lifts that leads to a failure of the spring can be markedly increased in comparison to coil springs such that the proposed spring is fatigue endurable or nearly fatigue endurable.

In addition, a comparatively large valve lift can be realized without the spring losing its fatigue endurance. Valve lifts of 1.2 mm or more can be realized with the proposed spring, whereby the check valve equipped with the proposed spring can be operated with higher volume flow at lower pressure loss.

According to a further embodiment, the spring arms are formed by the base body. It is feasible to fabricate the spring arms separately and to connect them in a further fabrication step with the base body. However, this is comparatively complex. The fabrication can be markedly simplified if the spring arms according to this embodiment are formed from the base body and the spring is developed unitarily from the outset. The base body must in this case only be provided with corresponding cutouts or clearances bordering the spring arms and defining bending lines. The spring arms are subsequently provided by bending the base body at the corresponding bending lines.

In a further developed embodiment, the spring can be fabricated of spring steel. By spring steel is to be understood a steel which, in comparison to other steels, has greater strength and an especially high elasticity limit. The material numbers 1.4310, 1.5023. 1.7108. 1.7701, 1.8159 and 1.1231, for example, indicate some spring steels. Due to the high elasticity limit of spring steels, the spring arms can be exposed to especially strong bending stresses without incurring failures.

According to a further embodiment, the spring arms form in each instance a bending line with the base body that extends perpendicularly to the longitudinal axis. The bending line defines that line along which the spring arms are bent or will be bent with respect to the base body. Due to this orientation of the bending lines with respect to the longitudinal axis of the spring arms it is ensured that no torsion forces but only pure bending forces act in the spring, whereby the proposed spring is fatigue endurable or nearly fatigue endurable.

In a further developed embodiment, the spring arms can in each instance form a bending line with the base body and the base body can comprise grooves extending parallel to one another, wherein the bending lines do not extend parallel to the grooves. Steels are in many cases rolled during the production in order to provide the steel ready to transport in the form of wound steel band. For this purpose two or more cylindrical rolls, oriented parallel to one another, are utilized, whereby the grooves extending parallel to one another form on the surface of the steel band. The grooves act as scores such that, in the event the bending lines extend parallel to the grooves, stress peaks are generated whereby the spring arms already break under comparatively low loading. Thereby that according to this embodiment the bending line does not extend parallel to the grooves but rather forms an angle with the grooves, such stress peaks and premature failure are prevented.

In a further embodiment the spring arms can in each instance comprise a contact region encompassing the free end which region is bent-off at an angle relative to the remaining spring arm. As already explained previously, the [relieved] spring arms lift from the first or second surface and therefore project at a certain angle from the particular surface. When coming into contact on adjacently disposed structural parts with the free end, a point or line contact would be generated which can locally lead to high stress. The contact region forms such angle relative to the remaining spring arm that the spring arm comes into contact with the adjacently disposed structural part where the contact region transitions into the remaining spring arm. The transition has a comparatively large radius. During the relative movements that take place between the spring arm and the adjacent structural part during compression and expansion, the friction force acting between the spring arm and the adjacently disposed structural part due to the contact in the transition is kept low such that a sliding relative movement is realized.

A further developed embodiment is thereby distinguished that the base body comprises abutment sections at which the spring arms abut for the delimitation of the maximal spring path. The abutment sections consequently delimit the maximally possible compression of the spring whereby the maximal bending moment which acts onto the spring arms is also delimited. The spring is therefore protected against too high a loading and breaking of the spring arms is prevented.

According to a further embodiment, the base body comprises a reception cutout. The reception cutout serves the purpose of assembling the spring for example on a mandril for which purpose the mandril is guided through the reception cutout or the spring is slid onto the mandril. Assembling and the correct orientation of the spring are hereby simplified.

A further embodiment is thereby distinguished that the reception cutout is, at least in sections, delimited by the spring arms. The material of the base body can hereby be kept minimal. However, in order to avoid stressing of the spring arms transmitted by the mandril, it is useful to develop the reception cutout such that no contact between the spring arms and mandril occurs. This can be attained, for example, through radially inwardly directed projections which establish the contact between the mandril and the base body.

A further embodiment is characterized thereby that the base body comprises at least one anti-twist protection section in order to brace the spring against rotation with respect to an adjacently disposed structural part. The anti-twist protection section can comprise, for example, bores in the base body, through which pins of the adjacently disposed structural part can be guided. Alternatively, radially outwardly directed widenings can be provided which engage into corresponding recesses of the adjacently disposed structural part. It is also feasible to provide the base body with straight radially outer edges which are in contact on equally straight edges of an adjacently disposed structural part. With the feasibility of bracing the spring against rotation, a defined orientation of the spring with respect to the adjacently disposed structural part can be set and be maintained during operation.

One physical form relates to a check valve, in particular for controllable vibration dampers, comprising a valve seat, a sealing washer, with which the check valve is closable or closed when the sealing washer is in contact on the valve seat, and a spring according to one of the previously discussed embodiments, with which the sealing washer is pressed into contact onto the valve seat.

The technical effects and advantages that can be attained with the proposed check valve correspond to those that have been explained for the present spring. In summary, it is pointed out that, due to the proposed physical form of the spring, the check valve can be implemented highly compactly and therefore requires only small installation space. Nevertheless, a comparatively large valve lift can be realized whereby the check valve can be operated with high volume flow at simultaneously low pressure loss. Due to the fact that the spring is implemented to be fatigue endurable or nearly fatigue endurable, the probability of failure of the check valve due to malfunction of the spring is nearly ruled out.

In a further physical form the base body of the spring can comprise a reception cutout, and the check valve can comprise a receiving body, onto which the spring can be slid so as to be axially movable, wherein the receiving body penetrates the reception cutout, and an abutment body with which the movability of the spring is delimitable with respect to the receiving body. The receiving body functions as a mandril onto which the base body is slid. The position of the spring in the radial direction is therewith sufficiently precisely determined. The abutment body serves primarily for the purpose of preventing the spring from sliding off the receiving body during the assembly. In the assembled state of the check valve the axial position of the spring is fixed in place by the spring arms. The abutment body can, for example, be connected with the receiving body by threaded connection or by being pressed onto the receiving body.

According to a further developed physical form, the sealing washer comprises a reception opening and is slidable onto the receiving body so as to be axially movable, wherein the receiving body penetrates through the reception opening and the movability of the sealing washer is delimitable with respect to the receiving body with the abutment body. Assembly of the check valve is hereby simplified since, in addition to the spring, the sealing washer can also be slid onto the receiving body and consequently is adequately fixed in its radial position.

A further physical form is distinguished thereby that the receiving body comprises at least one set-off against which the sealing washer can abut for delimiting the maximal spring travel. The set-off consequently delimits the maximally possible compression of the spring, whereby the maximal bending moment that acts onto the spring arms is also delimited. The spring is therefore protected against too high a loading and breaking of the spring arms is prevented.

According to a further developed physical form the check valve comprises a base body that defines a longitudinal valve axis and at least comprises a first channel, extending substantially along the longitudinal valve axis, and at least a second channel extending substantially perpendicularly to the longitudinal valve axis, wherein the second channel is opened on one side along the longitudinal valve axis. The check valve comprises furthermore a closing body closing the at least one second channel along the longitudinal valve axis in the assembled state of the check valve, wherein the receiving body is disposed between the base body and the closure body.

The base body and the closure body form the two bodies of the check valve, between which the receiving body is disposed. As already explained above, the spring and the sealing washer are slid onto the receiving body and axially secured with the abutment body. For the assembly the receiving body only needs to be positioned between the base body and the closure body. The base body and/or the closure body can comprise positioning aids in order to be able to fix the position of the receiving body with sufficient accuracy. The base body and the closure body are subsequently connected with one another whereby the assembly of the check valve is already completed. The closure body must be sealed against the base body which can take place by using, for example, a press fit or an O-ring. Assembling the check valve is therefore simple.

A further physical form is distinguished thereby that between the receiving body and the abutment body at least one tolerance compensation body is fixedly disposed, which, in the assembled state of the check valve, is in contact on the base body or on the closure body. The tolerance compensation body compensates fabrication imprecisions of the base body and of the closure body. The tolerance compensation body can, moreover, be disposed in the check valve such that the sealing washer in sections is in contact on the tolerance compensation body in the closed state of the check valve. With the thickness of the sealing washer as well as also with the thickness of the tolerance compensation body, the reset force of the spring can be changed and be adapted to the particular application cases.

One implementation of the application relates to a controllable vibration damper, in particular for motor vehicles, with a working cylinder, a piston, movable back and forth in the working cylinder, which divides the working cylinder into a first working volume and a second working volume, wherein the first working volume and the second working volume are each connected across a pressurizing medium line with a valve device for controlling the vibration damper, and wherein the valve device comprises at least one check valve according to one of the previously discussed implementations.

One permutation of the application relates to a motor vehicle with a vibration damper according to the previously explained execution.

One realization of the application relates to the use of the proposed spring in check valves of controllable vibration dampers.

The technical effects and advantages achievable with the proposed vibration damper, the motor vehicle and the use of the proposed spring correspond to those that have been explained for the present spring and the present check valve. In summary, reference is made to the fact that, due to the proposed physical form of the spring, the check valve can be executed highly compactly and therefore requires only small installation space. The vibration damper, by which is also to be understood a shock absorber of a motor vehicle, can consequently be implemented correspondingly compactly. Nevertheless, a comparatively large valve lift can be realized whereby the check valve can be operated with high volume flow at simultaneously low pressure loss. Due to the fact that the spring is implemented to be fatigue endurable or nearly fatigue endurable, the probability of failure of the check valve and of the vibration damper due to a malfunction of the spring is nearly ruled out. The vibration damper, and consequently the motor vehicle, can therefore be operated over a very long time without failure.

BRIEF DESCRIPTION OF THE DRAWINGS

Exemplary embodiments of the application will be discussed in detail with reference to the attached drawing. Therein depict.

DETAILED DESCRIPTION

Figure 1A:
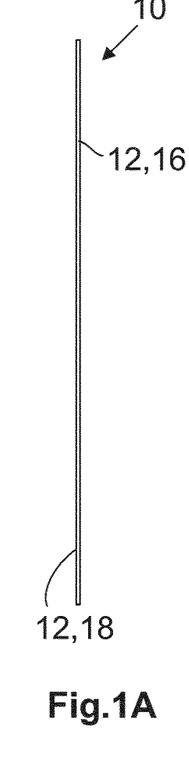
FIG. 1A a side view of a first embodiment of a spring in a not yet finished state, FIG. 1B a plan view onto the spring depicted in FIG. 1A, FIG. 1C a side view of the spring shown in FIGS. 1A and 1B in the installation state and in minimally loaded state, FIG. 1D a side view of the spring shown in FIGS. 1A and 1B in maximally loaded state, FIGS. 2A to 2D different views analogous to FIGS. 1A to 1D of a second embodiment of a spring, FIG. 3A a sectional representation of an embodiment of a check valve, FIG. 3B an enlarged representation of region X marked in FIG. 3A, and FIG. 4 a basic representation of a motor vehicle with a vibration damper comprising a check valve.
Figure 1B:
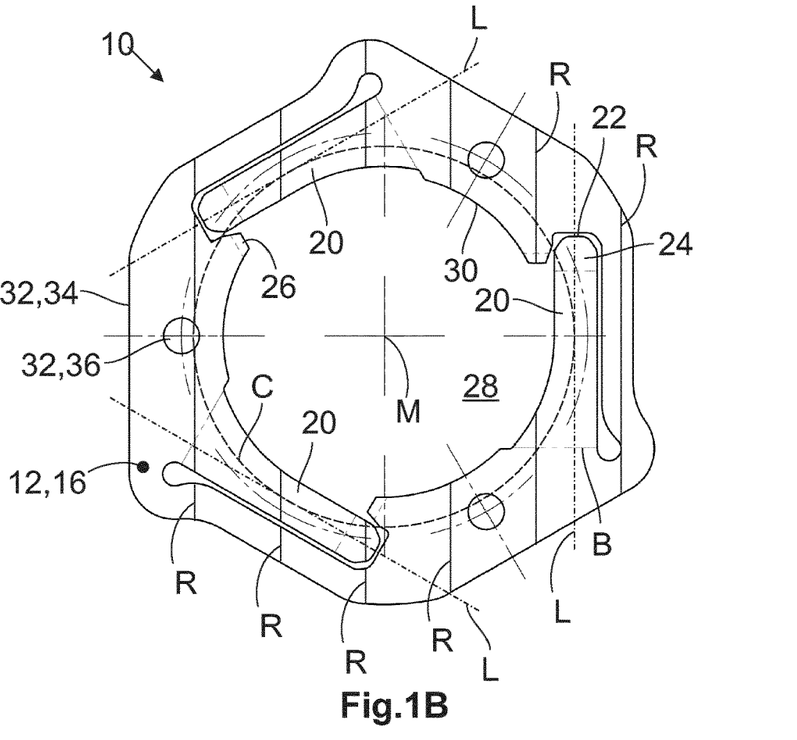

In FIG. 1A is shown a first embodiment example of a spring 10 in conjunction with a side view and in FIG. 1B in conjunction with a plan view, wherein the spring is in a not yet finished assembly state. The spring 10 comprises a laminar, in this case disk-shaped, base body 12 with a center point M, which forms a first surface 16 and a second surface 18. In addition, the base body 12 forms three spring arms 20 which have an elongated form and each has a free end 22. The spring arms 20 are defined by appropriate cutouts in the base body 12. Each of the spring arms 20 defines a longitudinal axis L that extends through the free end 22. The spring arms 20 are developed and oriented such that their longitudinal axes L extend tangentially to a circle C about the center point M of the base body 12. The spring arms 20 are, in addition, distributed uniformly over the circumference of the circle C such that the longitudinal axes L form an angle of 120° with one another. Deviations, for example angles greater than 120°, are feasible within certain limits. Deviations from the strictly tangential orientation of the longitudinal axes [L] are also feasible within certain limits.

Figure 1C:
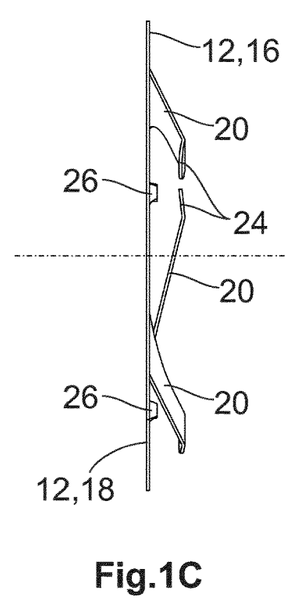
Figure 1D:
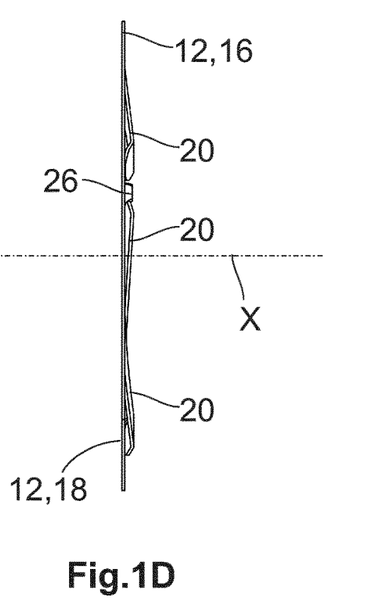

In FIGS. 1C and 1D can be seen the spring axis X which extends through the center point M and is defined by base body 12. As discernable in FIGS. 1C and 1D, in the completed state of the spring 10 the spring arms 20 in this case lift from the first surface 16. For this purpose the spring arms 20 are bent about a bending line B at a certain bending angle which [bending line] is especially clearly visible in FIG. 1B. The bending line B extends perpendicularly to the longitudinal axis L of the particular spring arm 20.

Furthermore is clearly evident in FIG. 1C that the spring arms 20 comprise a contact region 24 encompassing the free end 22, which contact region 24 is bent at an angle with respect to the remaining spring arm 20. The contact region 24 is also fabricated by bending. The contact region 24 is developed such that in the relieved state it extends substantially parallel to the first surface 16 or is slightly inclined toward the first surface 16.

It is furthermore discernible in FIG. 1B that the base body 12, comprised for example of spring steel, comprises production-inherent grooves R on the first surface [16] and the second surface 18, of which in FIG. 1B only some are depicted by example. The grooves R extend parallel to one another. The bending lines B, about which the spring arms 20 are bent during the production of the spring 10, do not extend parallel to the grooves R, but rather form an angle with grooves R. The bending lines B of the two left, referred to FIG. 1B, spring arms 20 form an angle of approximately 60° and the bending line B of the right spring arm [20] forms an angle of approximately 90° with the grooves R.

It is furthermore discernible in FIG. 1B that the base body 12 comprises overall three abutment sections 26, which are produced by deflecting about a bending edge at a bending angle of approximately 90°, which is evident in FIG. 1C. On the abutment sections 26 abut adjacently disposed structural parts such that the maximal spring travel by which the spring arms 20 can be bent, is delimited. Overloading of the spring arms 20 is hereby prevented.

The base body 12 is moreover provided with a reception cutout 28 substantially having a circular cross section. At least in the assembled state, shown in FIGS. 1A and 1B, the reception cutout 28 is radially, at least in the assembled state, shown in FIGS. 1A and 1B, outwardly delimited by spring arms 20 and by three circular arc-shaped sections 30 that are formed by radially inwardly directed projections of base body 12. The spring 10 lies only with these circular arc-shaped sections 30 in contact on, for example, a mandril as will be explained in greater detail further down. Contact of the mandril on the spring arms 20 is therefore prevented and the transmission of frictional forces from the mandril onto the spring arms 20 and dragging is prevented.

The base body 12, furthermore, forms overall three anti-twist protection sections 32 which, in the embodiment example shown in FIGS. 1A to 1D, comprise each a straight edge 34 which is disposed radially outward on the base body 12. With these edges 34 the spring 10 can be in contact on an appropriately formed adjacently disposed structural part. The anti-twist protection sections 32 comprise, furthermore, in each instance a bore 36 which can also be slid onto correspondingly disposed pins of an adjacently disposed structural part. Utilizing both measures can prevent the uncontrolled twisting of the spring 10 during operation.

In FIGS. 2A to 2D is depicted a second embodiment example of the spring 10 in the same manner as the first embodiment example. The maximal diameter of the base body 12 of spring 10 according to the second embodiment example is less than that according to the first embodiment example. Accordingly, the length of the spring arms 20 is less than in the first embodiment example.

The anti-twist protection section 32, furthermore, is developed differently and comprises three radially outwardly directing expansions 38 which can engage into corresponding recesses of an adjacently disposed structural part. The base body 12 according to the second embodiment example does not comprise abutment sections 26.

Figures 2A, 2B:
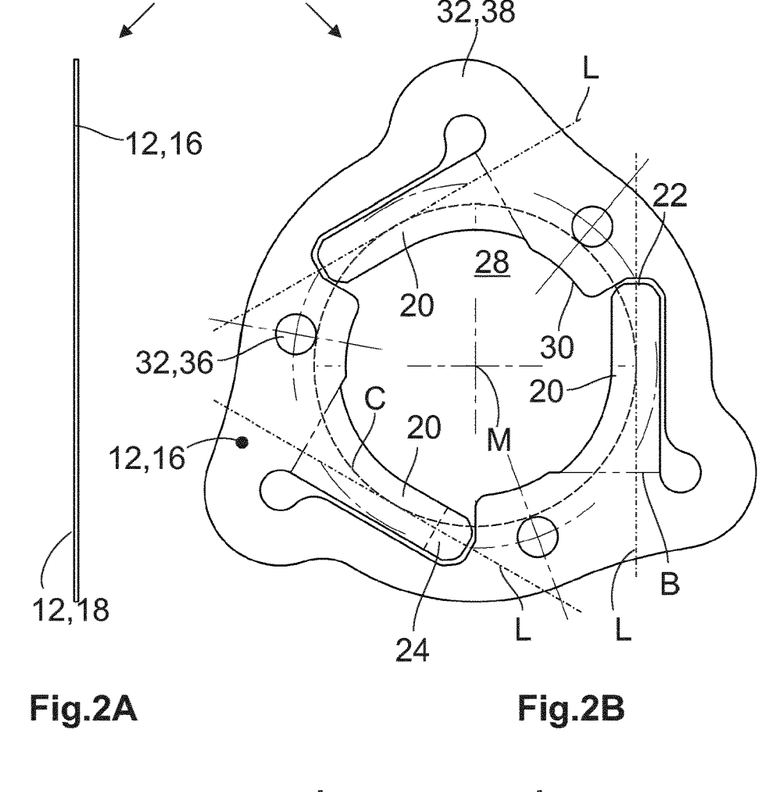
Figure 2C:
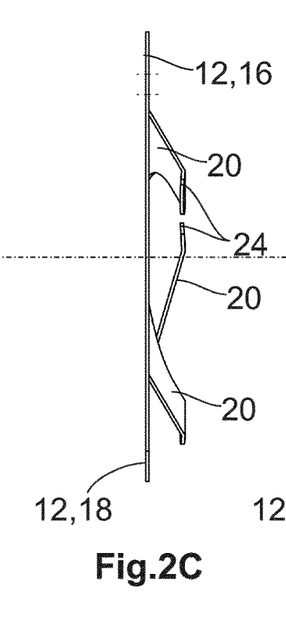
Figure 2D:
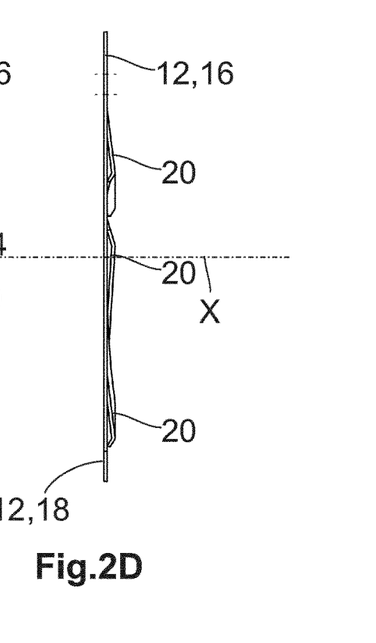

The structure of the spring 10 according to the second embodiment example for the remainder is substantially equal to that of the first embodiment example. The grooves R in FIG. 2B are not drawn in FIG. 2B for purposes of presentation.

Figure 3A:
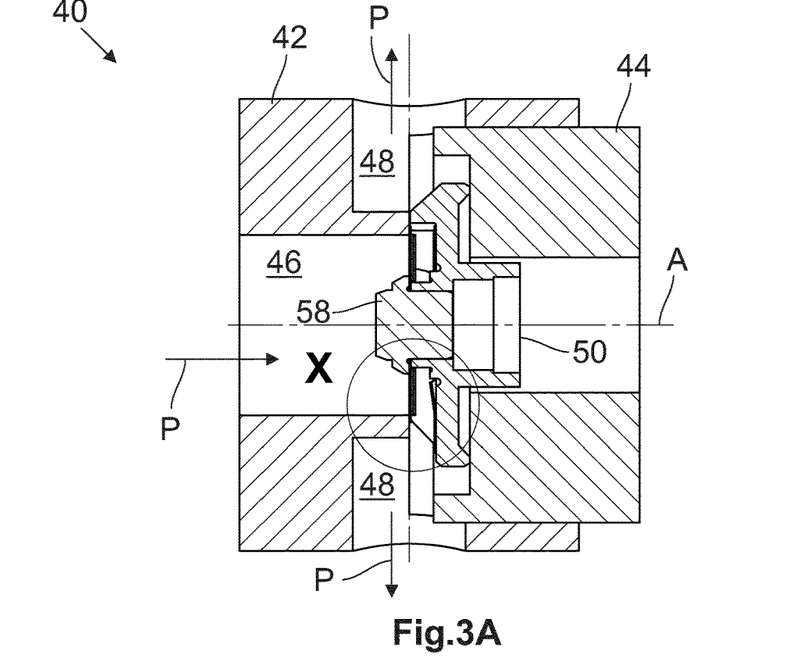
Figure 3B:
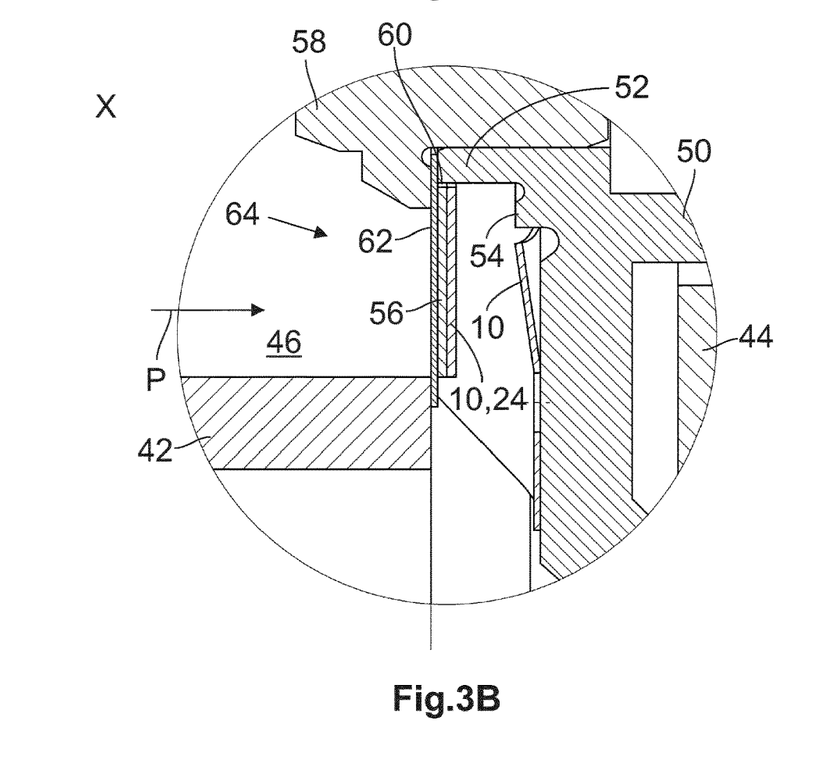

In FIG. 3A is shown an embodiment example of a check valve 40 in the assembled state in conjunction with a sectional representation. In FIG. 3B is shown an enlargement of the detail marked X in FIG. 3A. The check valve 40 comprises a base body 42 and a closure body 44. The base body 42 defines a longitudinal valve axis A as well as a first channel 46 and a number of second channels 48. The first channel 46 extends along the longitudinal valve axis A, while the second channels 48 extend perpendicularly thereto. The second channels 48 are partially opened along the longitudinal valve axis A, referred to the presentation of FIG. 3A toward the right. The second channels 48 are consequently only completely closed after the closure body 44 has been set into the base body 42. It is therefore necessary for the closure body 44 to be set into the base body 42 under sealing, which can take place, for example, using not shown O-rings or by means of a press fit.

Between the base body 42 and the closure body 44 a receiving body 50 is disposed. The receiving body 50 fulfills the function of a mandril such that the spring 10 can be slid onto the receiving body 50, wherein the receiving body 50 penetrates the reception cutout 28 of spring 10 with a reception section 52. The position of the spring 10 is consequently radially sufficiently fixed in place. The receiving body 50 furthermore forms a set-off 54 onto which the sealing washer 56 can abut, whereby the maximal spring travel of the spring arms 20 is delimited and consequently too strong a deflection of the spring arms 20 is prevented.

As is especially evident in FIG. 3B, onto the receiving body 50 a sealing washer 56 is slid additionally, for which purpose the sealing washer 56 comprises a reception opening 60. To prevent the sealing washer 56 and the spring 10 to detach axially from the receiving body 50, an abutment body 58 is connected with the receiving body 50, for example by joining them under pressure or by a threaded connection. The abutment body 58 projects radially outwardly beyond the reception section 52. The spring arms 20 are in contact on the sealing washer 56 and press it against the abutment body 58 which delimits the axial movability of the sealing washer 56.

In FIG. 3B is discernible that the diameter of the reception opening 60 is slightly larger than the diameter of the reception section 52. It is hereby prevented that an uneven loading of the sealing washer 56, which entails a rotation of the sealing washer 56 about a rotational axis extending perpendicularly to the longitudinal valve axis A, engenders the jamming of the sealing washer 56 on the reception section 52.

As is also evident in FIG. 3B, a disk-shaped tolerance compensation body 62 is provided which is secured under clamping between the receiving body 50 and the abutment body 56 on these two bodies. Radially outward the tolerance compensation body 62 is in contact on the base body 42. The sealing washer 56 is pressed by the spring 10 against the tolerance compensation body 62. The thickness of the tolerance compensation body 62 and of the sealing washer 56 can be varied in order to compensate tolerances, for example, of the spring 10 and to set its reset force.

The abutment body 58 and the base body 42 form a valve seat 64 against which the sealing washer 56 is pressed when the spring 10 is not under load. Hereby the check valve 40 is also closed. The check valve 40 comprises therefore an annular gap that can be closed by the sealing washer 56. It should be noted that the tolerance compensation body 62 in [not shown] plan view substantially comprises two concentric annuli that are connected with a number of radially extending webs. The section plane of FIGS. 3A and 3B extends through some of these webs such that the impression is generated of the check valve 40 being closed by the tolerance compensation body 62. However, this is only the case in the region of the webs. Since in this embodiment example the tolerance compensation body 62 rests on the receiving body 50 as well as also on the base body 42, and the sealing washer 56 is pressed against the tolerance compensation body 62, the valve seat 64 is also formed by the tolerance compensation body 62. Use of the tolerance compensation body 62, however, is not mandatory.

The check valve 40 is exclusively fluid controlled. When a fluid flows along the direction marked by the arrows P of FIG. 3A through the first channel 46, the fluid exerts a fluid force onto the sealing washer 56 which, as a consequence, is moved along the longitudinal valve axis A away from the tolerance compensation body 62. Due to this movement, the spring arms 20 are bent whereby these apply a reset force onto the sealing washer 56 which counteracts the fluid force. The sealing washer 56 comes to a standstill where the fluid force and the reset force are of equal magnitude. Due to the movement of the sealing washer 56 away from the tolerance compensation body 62, the check valve 40 is opened and the fluid can leave the check valve 40 across the second channels 48. If the flow velocity decreases, if the flow stops or the direction of flow reverses, the fluid force decreases or the fluid force acts in the opposite direction onto the sealing washer 56. The sealing washer 56 is consequently again pressed against the tolerance compensation body 62 and closes the check valve 40.

Figure 4:
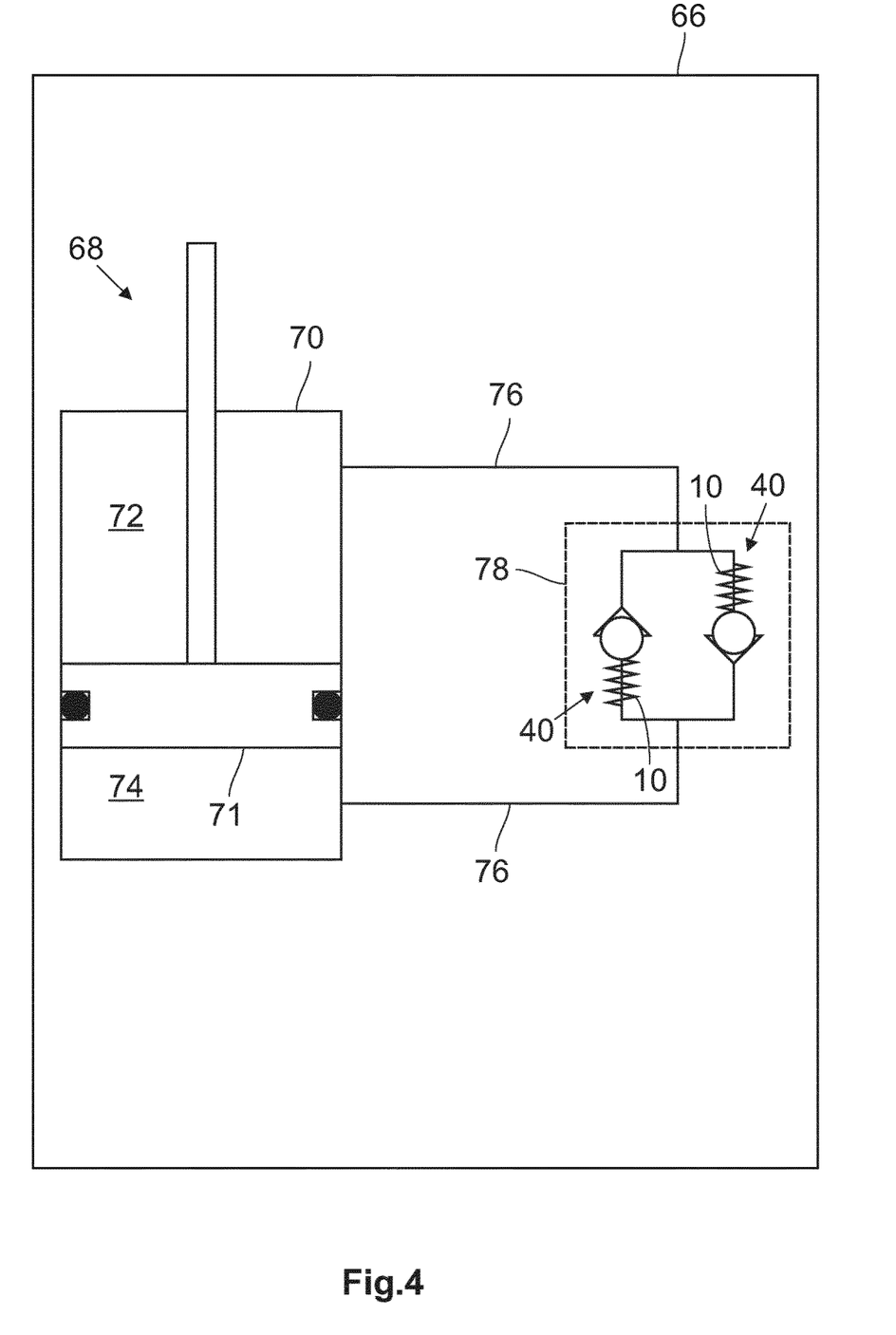

FIG. 4 shows a motor vehicle 66 in conjunction with a schematic diagram, which comprises a controllable vibration damper 68, developed in this case as a shock absorber. The vibration damper 68 comprises a working cylinder 70 in which a piston 71 is disposed such that it is movable back and forth. The piston 71 divides the working cylinder 70 into a first working volume 72 and into a second working volume 74. The first working volume 72 and the second working volume 74 are each connected with a valve device 78 across a pressurizing medium line 76. With this valve device 78 the first and the second working volume 72, 74 can be supplied with a pressurizing medium, for example with a hydraulic fluid or compressed air, in the desired manner whereby the vibration damper 68 becomes controllable. The hydraulic or pneumatic structural unit, disposed for this purpose in the valve device 78, are not shown separately, however the structure of the valve device 78 can be oriented, for example, toward the valve device 78 depicted in DE 38 03 888 A. The valve device 78 shown in FIG. 4 comprises at least one check valve 40, which is depicted in FIGS. 3A and 3B, wherein the check valve 40 comprises a spring 10 according to FIG. 1 or 2. In the example depicted in FIG. 4 the valve device 78 comprises two check valves 40 which are connected in parallel, however open and close in opposite directions. When using different springs 10, different pressure conditions in the first and the second working volume 72, 74 and controllable and direction-dependent damping properties of the vibration damper can be realized.

LIST OF REFERENCE SYMBOLS

10 Spring
12 Base body
16 First surface
18 Second surface
20 Spring arm
22 Free end
24 Contact region
26 Abutment section
28 Reception cutout
30 Circular arc-shaped section
32 Anti-twist protection section
34 Edge
36 Bore
38 Expansion
40 Check valve
42 Base body
44 Closure body
46 First channel
48 Second channel
50 Receiving body
52 Reception section
54 Set-off
56 Sealing washer
58 Abutment body
60 Reception opening
62 Tolerance compensation body
64 Valve seat
66 Motor vehicle
68 Vibration damper
70 Working cylinder
71 Piston
72 First working volume
74 Second working volume
76 Pressurizing medium line
78 Valve device
A Longitudinal valve axis
B Bending line
C Circle
L Longitudinal axis
M Center point
P Arrow
R Groove
X Spring axis

The invention claimed is:

1. A spring for a check valve, comprising:
a laminar base body with a first surface, a second surface and a center point,
two or more spring arms cooperating resiliently with the base body and which, in a relieved state, lift from the first surface or the second surface,
wherein the spring arms form a free end and have a longitudinal axis that extends through the free end and tangentially to a circle about the center point of the base body,
wherein the spring arms form in each instance a bending line with the base body, and the base body comprises grooves extending parallel to one another, wherein the bending lines do not extend parallel to the grooves.

2. The spring as in claim 1,
wherein the spring arms are formed by the base body.

3. The spring as in claim 1,
wherein the spring arms form in each instance a bending line with the base body, and wherein the bending line extends perpendicularly to the longitudinal axis.

4. The spring as in claim 1,
wherein the spring arms comprise in each instance a contact region encompassing the free end, which is bent at an angle with respect to the remaining spring arm.

5. The spring as in claim 1,
wherein the base body comprises abutment sections onto which abut adjacently disposed structural parts.

6. The spring as in claim 1, wherein the base body comprises a reception cutout.

7. The spring as in claim 6, wherein the reception cutout is at least in sections delimited by the spring arms.

8. The spring as in claim 1,
wherein the base body comprises at least one anti-twist protection section to fix the spring in place so as to be braced against rotation relative to an adjacently disposed structural part.

9. A check valve, comprising:
a check valve with a valve seat,
a sealing washer, with which the check valve is closable or is closed, when the sealing washer is in contact on the valve seat, and a spring, comprising:
  a laminar base body with a first surface, a second surface and a center point,
  two or more spring arms cooperating resiliently with the base body and which, in a relieved state, lift from the first surface or the second surface, wherein the spring arms form a free end and have a longitudinal axis that extends through the free end and tangentially to a circle about the center point of the base body,
wherein a spring of the spring arms presses the sealing washer into contact onto the valve seat,
  wherein the base body of the spring comprises a reception cutout, and
wherein the check valve comprises a receiving body onto which the spring is axially movable slidable, wherein the receiving body penetrates the reception cutout, and an abutment body with which the movability of the spring with respect to the receiving body can be delimited.

10. The check valve as in claim 9,
wherein the sealing washer comprises a reception opening and is slidably, axially movable onto the receiving body,
wherein the receiving body penetrates the reception opening, and wherein movability of the sealing washer relative to the receiving body is delimitable with the abutment body.

11. The check valve as in claim 10,
wherein the receiving body comprises at least one set-off against which the sealing washer abuts.

12. The check valve as in claim 9, further comprising:
a base body that defines a longitudinal valve axis and at least one first channel extending at least substantially along the longitudinal axis and at least one second channel substantially extending perpendicularly to the longitudinal valve axis, wherein the second channel is opened on one side along the longitudinal valve axis, and
a closure body closing off the at least one second channel along the longitudinal valve axis in an assembled state of the check valve,
wherein the receiving body is disposed between the base body and the closure body.

13. The check valve as in claim 12,
wherein between the receiving body and the abutment body at least one tolerance compensation body is fixedly disposed which, in the assembled state of the check valve, is in contact on the base body or on the closure body.

14. The check valve as in claim 12, further comprising:
a working cylinder,
a piston, movable back and forth in the working cylinder, that divides the working cylinder into a first working volume and a second working volume,
wherein the first working volume and the second working volume are each connected across one pressurizing medium line with the check valve, wherein the check valve controls a vibration damper.

* * * * *